June 19, 1956 C. R. FREDRIKSEN 2,751,173
METAL SWITCH BOX MOUNTING BRACKETS
Filed Jan. 2, 1952
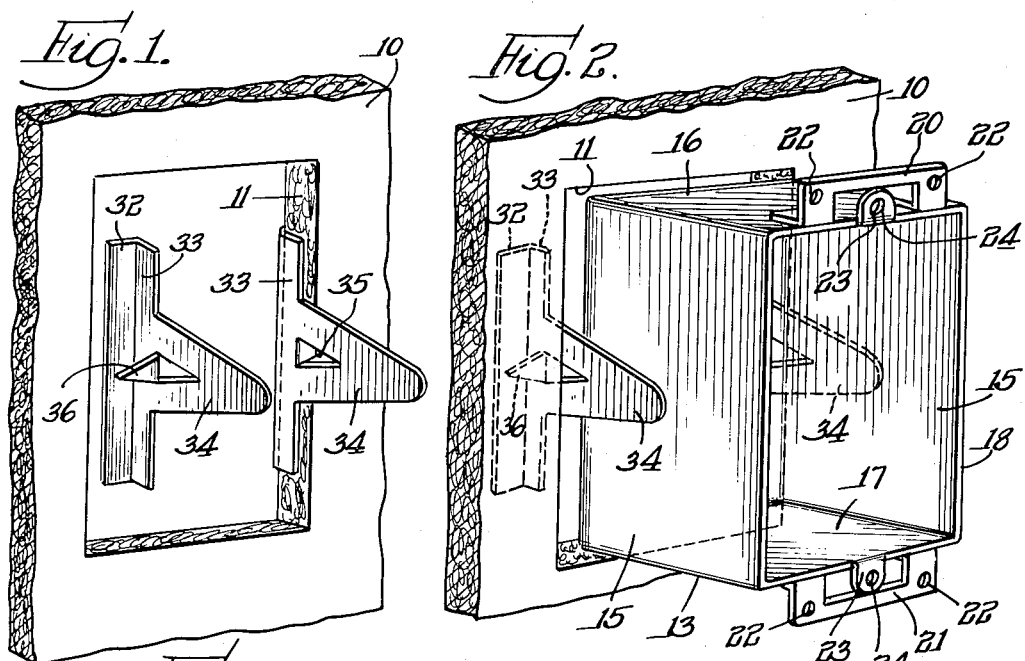
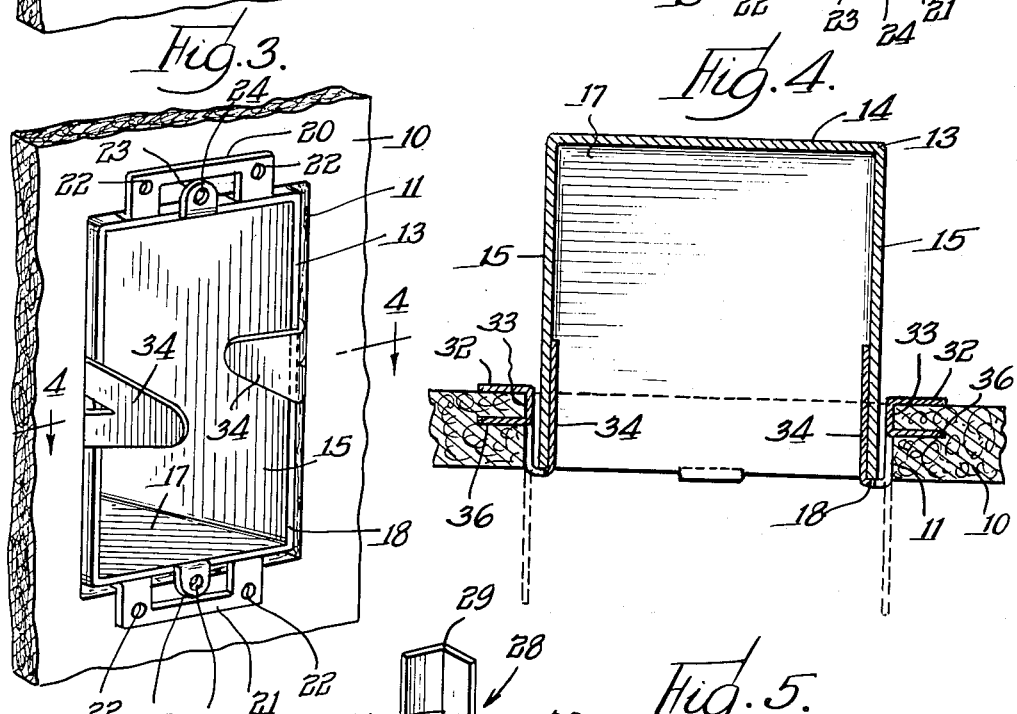
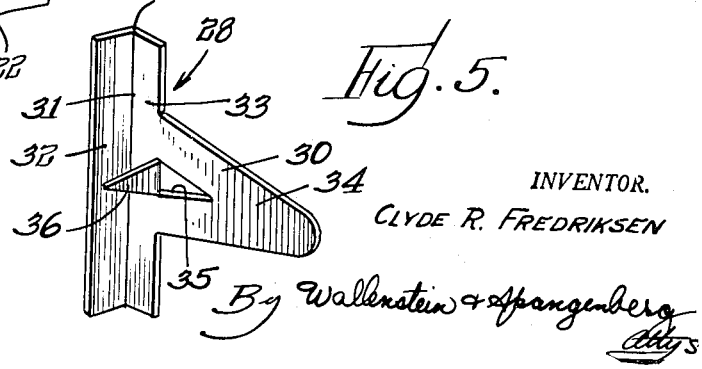
INVENTOR.
CLYDE R. FREDRIKSEN
By Wallenstein & Spangenberg
Attys

United States Patent Office 2,751,173
Patented June 19, 1956

2,751,173

METAL SWITCH BOX MOUNTING BRACKETS

Clyde R. Fredriksen, Gurney, Wis., assignor to Henry Hildebrandt, Genoa City, Wis.

Application January 2, 1952, Serial No. 264,437

2 Claims. (Cl. 248—27)

This invention relates to mounting brackets for securing a switch box in a wall made of plasterboard or the like.

Switch boxes having switches for controlling electric lights and the like are usually substantially flush mounted in a wall. These boxes are provided with an open front face and have upwardly and downwardly extending projections at the top and bottom of the open front face which engage the wall when the switch box is inserted in an opening in the wall. These projections are usually provided with holes for receiving screws to secure the switch box in the wall when the wall is made of wood, lath or the like to firmly anchor the screws.

When, however, the wall is made of wallboard, plasterboard and the like, such screws cannot be firmly anchored therein and the switch box would soon become loose from the wall. Various arrangements, including clamping devices, brackets and the like, have been proposed for securing switch boxes in openings in walls of plasterboard and the like, but they have been largely unsuccessful due to their destructive action on the wall and their inability to be readily used and installed.

The principal object of this invention is to provide an improved metal mounting bracket, for securing in an opening in a wall of plasterboard or the like, a switch box having upwardly and downwardly extending projections at the top and bottom of its open front face for engaging the front surface of the wall, which will have no destructive action on the wall, which may be simply and quickly used without the use of tools, which may be secured in place in the wall opening while the switch box is being inserted in the wall opening, which permits permanent installation of the switch box in the wall opening in less than a minute, which may be removed and used over again, which may be attached anywhere along the wall opening, and which may be inexpensively manufactured.

Further objects of this invention reside in the details of construction of the metal switch box mounting brackets and the cooperative relationship between the brackets, switch box and wall opening.

Other objects and advantages of this invention will become apparent to those skilled in the art upon reference to the accompanying specification, claims and drawing in which:

Fig. 1 is a partial perspective view of a wall of plasterboard, or the like, having an opening therein along with the brackets of this invention being applied to the opening;

Fig. 2 is a view similar to Fig. 1, but illustrating the brackets secured in place in the opening and the switch box being inserted in the opening;

Fig. 3 is a view similar to Figs. 1 and 2, but showing the switch box located in the opening substantially flush with the front surface of the wall and being held in place by the brackets of this invention;

Fig. 4 is a horizontal sectional view taken substantially along the line 4—4 of Fig. 3; and Fig. 5 is a perspective view of one of the brackets.

Referring first to Figs. 1 to 3, there is illustrated a wall 10 made of plasterboard, wallboard, or the like, having a substantially rectangular opening 11 for receiving a switch box 13 of conventional construction. The switch box 13 has a rear wall 14, a pair of side walls 15, a top wall 16, a bottom wall 17 and an open front face 18. The various walls may be provided with suitable knockouts to accommodate electrical wiring for the switch normally included in the switch box.

The top and bottom walls 16 and 17 adjacent the open front face 18 of the switch box are provided with upwardly and downwardly extending projections 20 and 21. These projections 20 and 21 may be in the form of brackets secured to the top and bottom walls of the switch box. These brackets or projections 20 and 21 are normally provided with holes 22 for accommodating screws for securing the switch box in place on a wall. These brackets are normally spaced rearwardly from the front face 18 of the switch box 13 when the switch box is to be secured by screws to the lath of a conventional plaster wall. When, however, the switch box is to be secured in an opening in a wall made of plasterboard, wallboard, or the like, these projections 20 and 21 are normally moved forwardly in substantial alignment with the open front face 18 of the switch box 13 so that the switch box may be flush mounted in the wall. The open front face 18 of the switch box is also provided with a pair of ears 23 having screw-threaded holes 24, to which is secured the switch structure normally included in the switch box.

The brackets of this invention for securing the switch box 13 in the opening 11 in the wall of plasterboard, or the like, are preferably made of sheet metal and one of them is generally designated at 28 in Fig. 5. The bracket 28 includes a sheet metal member having a substantially rectangular portion 29 and a substantially triangular portion 30 extending from one side thereof. The substantially rectangular portion 29 is longitudinally bent at substantially right angles, as indicated at 31, to form an elongated angle bracket. This angle bracket has one leg 32 and another leg 33. The substantially triangular portion 30 forms an ear 34 extending outwardly from the leg 33. A portion of the ear 34 is punched out, as indicated at 35, to form a sharp prong 34 which extends substantially parallel to and overlies the first leg 32.

In securing the switch box in the wall opening two mounting brackets 28 are preferably used, one being associated with each side of the wall opening 11. The brackets 28 are inserted in the wall opening 11 with the first legs 32 thereof overlying and engaging the rear surface of the wall 10 at the opening 11. The prongs 36 are pushed into the sides of the opening 11 for the purpose of holding the brackets in place in the opening, all as shown in Fig. 1. The switch box 13 is then inserted in the opening 11, as illustrated in Fig. 2, and is then moved rearwardly in the opening until the upwardly and downwardly extending projections 20 and 21 engage the front surface of the wall 10, as indicated in Fig. 3. The ears 34 of the brackets extend forwardly between the sides of the switch box and the sides of the opening. The extending ends of the ears 34 are then folded over and into the open front face 18 of the switch box 13, as illustrated in Figs. 3 and 4. In this way the switch box is firmly and permanently secured in the opening. The upwardly and downwardly extending projections 20 and 21 prevent rearward movement of the switch box with respect to the wall and the brackets prevent forward movement thereof with respect to the wall.

The mounting brackets may be positioned in place along the sides of the opening and the sides of the switch box as desired. They may be centrally located, as illustrated, or they may be arranged upwardly or downwardly from the positions shown. The prongs 36 operate to maintain the mounting brackets in place while the switch box is being inserted in the opening, thus greatly facilitating the mounting of the switch box. No tools are needed for the purpose of mounting the switch box when utilizing the mounting brackets of this invention. When and if the switch box is removed, which may be accomplished by bending the ears 34 outwardly, the mounting brackets may be used over again.

While for purposes of illustration one form of this invention has been disclosed, other forms thereof may become apparent to those skilled in the art upon reference to this disclosure and, therefore, this invention is to be limited only by the scope of the appended claims.

I claim as my invention:

1. A metal bracket, which is utilized in pairs for securing in an opening in a wall of plasterboard or the like a switch box having upwardly and downwardly extending projections at the top and bottom of its open front face for engaging the front face of the wall, comprising a metal angle bracket having a first wide leg for engaging the rear face of the wall and a second narrow leg for extending forwardly between the wall opening and the side of the switch box and including an ear portion constructed to be folded over the front side edge of the switch box into the switch box for securing the switch box in place in the opening in the wall, said first leg extending from one side face only of said second leg, and said second leg having a pointed prong adjacent to and extending substantially parallel with the first leg for insertion into the edge of the wall opening with the first leg engaging the back of the wall for holding the bracket in proper place on the wall as the switch box is being inserted in the opening in the wall and as the ear portion is being folded over the front side edge of the switch box.

2. A metal bracket, which is utilized in pairs for securing in an opening in a wall of plasterboard or the like a switch box having upwardly and downwardly extending projections at the top and bottom of its open front face for engaging the front face of the wall, comprising a sheet metal angle bracket having a first leg which is elongated in the direction of the wall opening for engaging the rear face of the wall for a substantial distance along the wall opening and a second leg for extending forwardly between the wall opening and the side of the switch box and being of lesser width than the first leg in the direction of the wall opening and being substantially triangular in shape and forming a narrow ear portion constructed to be folded over the front side edge of the switch box into the switch box for securing the switch box in place in the opening in the wall, said first leg extending from one side face only of said second leg, and said second leg having a pointed prong punched therefrom and arranged adjacent to and substantially parallel with the first leg for insertion into the edge of the wall opening with the first leg engaging the back of the wall for holding the bracket in proper place on the wall as the switch box is being inserted in the opening in the wall and as the ear portion is being folded over the front side edge of the switch box.

References Cited in the file of this patent

UNITED STATES PATENTS

| | | |
|---|---|---|
| 299,356 | Denton | May 27, 1884 |
| 321,864 | Taylor | July 7, 1885 |
| 1,697,456 | Carlson | Jan. 1, 1929 |
| 1,819,460 | Frank | Aug. 18, 1931 |
| 1,974,819 | Koerner | Sept. 25, 1934 |
| 2,448,359 | Davison | Aug. 31, 1948 |
| 2,518,912 | Lampe | Aug. 15, 1950 |
| 2,586,728 | Shepard | Feb. 19, 1952 |